United States Patent [19]

Germgård et al.

[11] Patent Number: 5,741,398

[45] Date of Patent: Apr. 21, 1998

[54] METHOD OF REMOVING METAL IONS DISSOLVED IN THE BLEACH PLANT WASTE WATER

[75] Inventors: Ulf Germgård, Sundsbruk; Solveig Nordén, Njurunda, both of Sweden

[73] Assignee: Sunds Defibrator Industries Aktiebolag, Sweden

[21] Appl. No.: 779,255

[22] Filed: Jan. 3, 1997

Related U.S. Application Data

[63] Continuation of Ser. No. 392,803, Feb. 28, 1995, abandoned.

[30] Foreign Application Priority Data

Aug. 28, 1992 [SE] Sweden ............................ 9202464
Apr. 7, 1993 [SE] Sweden ............................ 9301160

[51] Int. Cl.[6] ............................................. D21C 11/00
[52] U.S. Cl. ........................... 162/37; 162/65; 162/78; 162/DIG. 8
[58] Field of Search ........................... 162/37, 38, 60, 162/65, 76, 29, DIG. 7, DIG. 8; 210/723, 724, 928

[56] References Cited

U.S. PATENT DOCUMENTS

| | | | |
|---|---|---|---|
| 5,352,332 | 10/1994 | Maples et al. | 162/30.1 |
| 5,401,362 | 3/1995 | Lindberg | 162/37 |
| 5,462,641 | 10/1995 | Bergvist et al. | 162/40 |
| 5,554,259 | 9/1996 | Gandek et al. | 162/48 |

FOREIGN PATENT DOCUMENTS

| | | |
|---|---|---|
| 0456626 | 11/1991 | European Pat. Off. . |
| 80018393 | 3/1980 | Sweden . |

OTHER PUBLICATIONS

Casey, P. J. "Pulp & Paper . . . ", by John Wiley & Sons, 3rd Ed. vol. I, 1980, pp. 728–731.

*Primary Examiner*—Donald E. Czaja
*Assistant Examiner*—Dean T. Nguyen
*Attorney, Agent, or Firm*—Lerner, David, Littenberg, Krumholz & Mentlik

[57] ABSTRACT

Methods of treating process water containing metal ions is disclosed including contacting the process water with a pulp comprising lignocellulose-containing material at a pH of above about 7 and a temperature of from about 50° to 120° C. whereby at least a portion of the metal ions are removed from the process water. Preferably the process water is produced from initially washing a pulp solution prior to a bleaching step employing hydrogen peroxide or ozone.

6 Claims, 1 Drawing Sheet

METHOD OF REMOVING METAL IONS DISSOLVED IN THE BLEACH PLANT WASTE WATER

This is a continuation of application Ser. No. 08/392,803 filed Feb. 28, 1995 now abandoned.

FIELD OF THE INVENTION

The present invention relates to a method of treating process water. More particularly, the present invention relates to methods of treating process water which contains metal ions, primarily in connection with the bleaching of pulp comprising lignocellulose-containing material.

BACKGROUND OF THE INVENTION

In order to minimize the effects of various emissions, such as BOD, COD, paint, etc. on the environment, there has developed a strong interest in restricting these emissions by closing the wastewater systems of bleach plants. This therefore implies that the wastewater should be recycled to the process, instead of being emitted to the environment. As a result of closing these systems, however, the content of metal ions, such as manganese, copper, iron, etc. In the system can increase to a level which creates problems during subsequent bleaching with hydrogen peroxide and, respectively, ozone.

These metal ions enter the system via the raw wood material and, therefore, the effluent of metal ions cannot be eliminated, as would be desirable from a process point of view. The content of these metal ions in the pulp, however, is very low and, therefore, they do not cause any environmental problem, either in the local working environment or in the recipient.

In the future, the bleaching of papermaking pulp will be based to a high degree of hydrogen peroxide bleaching and ozone bleaching. In order to achieve high ISO-brightness levels, these types of bleaching require the unbleached pulp and process water to be free, or substantially free, of certain metal ions. Otherwise, a considerable disintegration of charged hydrogen peroxide to water and oxygen and, respectively, of charged ozone to oxygen will take place, without any simultaneous bleaching effect.

In order to remove these metal ions prior to bleaching, the pulp must be pretreated with chemicals, examples of which are acid or complex forgers such as EDTA or DTPA, which selectively bind the undesired metal ions and thereby render it possible to wash them out prior to bleaching. For process reasons, the resulting washing water must be eliminated from the system, but at the same time, for environmental reasons, the washing water must not be emitted.

The present invention offers a solution to the aforesaid problems. The invention, thus, has the object of removing metal ions from process water enriched in metals, thereby rendering it possible to re-use the process water, and thereby closing the wastewater system of the bleach plant, which is desirable from an environmental point of view.

SUMMARY OF THE INVENTION

These and other objects have now been realized by the invention of a method for treating process water containing metal ions which includes contacting the process water with a pulp comprising lignocellulose-containing material at a pH of greater than about 7 and at a temperature of from about 50° to 120° C. whereby at least a portion of the metal ions are removed from the process water. In a preferred embodiment, the process water is contacted with the pulp at a pH of at least about 11, preferably at a pH of between 11 and 12.

In accordance with another embodiment of the method of the present invention, the pulp is selected from the group consisting of bleached pulp, unbleached pulp, and reject pulp.

In accordance with another embodiment of the method of the present invention, the method includes providing a pulp comprising lignocellulose-containing material, washing the pulp so as to produce the process water therefrom, bleaching the pulp with a bleaching agent selected from the group consisting of hydrogen peroxide and ozone, and contacting the process water with a bleached pulp at a pH of greater than about 7 and at a temperature of from about 50° to 120° C., whereby at least a portion of the metal ions are removed from the process water. In accordance with the preferred embodiment of this method of the present invention, the process water is contacted with the bleached pulp at a pH of at least about 11, and preferably at a pH of between about 11 and 12. In accordance with another embodiment, the method includes treating the pulp with complex former prior to the washing step.

BRIEF DESCRIPTION OF THE DRAWINGS

The present invention will be more fully appreciated with reference to the following detailed description, which, in turn, refers to the drawings in which.

DETAILED DESCRIPTION

Figure 1:
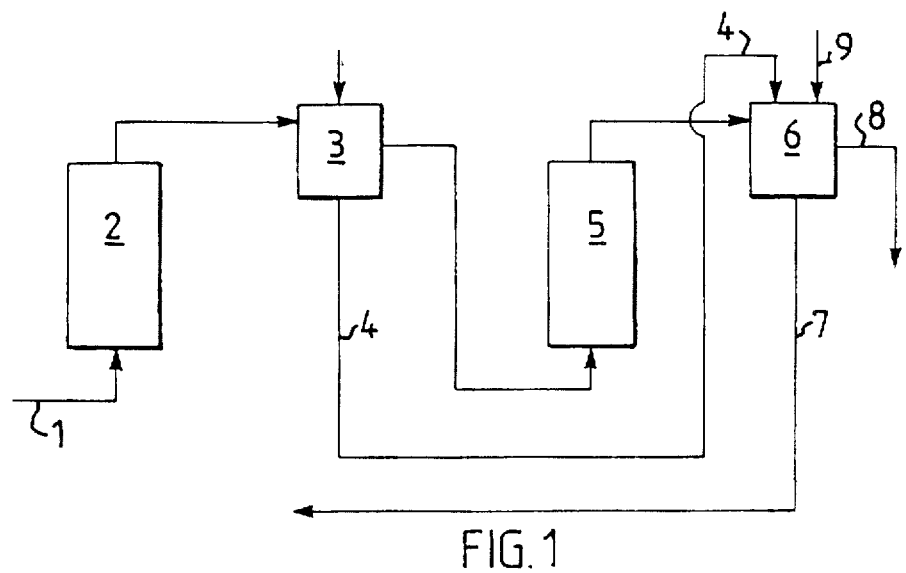
FIG. 1 is a flow diagram of the application of a method according to the present invention.

Referring first to FIG. 1, unbleached pulp is supplied through a duct 1 to a pre-treatment step 2 where the pulp is treated with acid or a complex former, such as EDTA and DTPA. Metals such as manganese are here dissolved out of the fiber material. The pulp is then directed to a first washing step 3, for example in the form of a washing press or washing filter, where wastewater containing the critical metal ions is removed through a duct 4. The pulp, which is now free of critical metal ions, is directed to a bleaching step 5 where it is bleached with hydrogen peroxide or ozone. After the bleaching step 5, the pulp is directed to a second washing step 6 where the wastewater from the first washing step 3, from duct 4, is once again brought into contact with the pulp, and where the pulp again binds the original metal ions. The wastewater from the second washing step is discharged through a duct 7, and the washed pulp is removed through a duct 8. The wastewater, now substantially free of metal ions, can now be used as washing water in situations where a low content of metals is of importance, such as in a bleach plant entirely free of chlorine. The wastewater can be used in other steps of the process. In order to achieve an improved washing effect relating, for example, to COD etc., it can also be of interest to use an additional washing liquid 9 in the washing step 6 after the bleaching step.

The pulp will thus transport the metals out of the bleach plant, and the accumulation effect in the bleach plant can thus be avoided with the closing of the drain system.

The pulp, somewhat enriched in metal according to the present invention, can now be used in a conventional manner directly in the papermaking process, or it can first be purified from metal ions, for example by treatment with washing water containing complex former at a lower pH, or it can be destructed.

It has been found that suitable conditions for achieving good elimination of the metal ions during the second washing step 6 shall be as follows: a pH of above about 7, suitably above about 10.5, and preferably at a pH of 11 or higher. Of particular interest is the use of a pH of between about 11.5 and 12. The temperature during this step should be from between about 50° and 120° C., and preferably between about 70° and 100° C. The contact time between process water and pulp can be very short. At optimum conditions, the time can be shorter than about 1 second, but slightly longer times, such as from about 1–6 seconds, are generally better. Longer reaction times, such as from about 0.1–6 min, can also be applied, but doing so does not appreciably affect the result. A time exceeding 1–5 min, therefore, is normally of no interest. The reaction time is normally determined by the nature of the washing equipment being used. Very short stay times can thus be achieved both during the usage of a washing press and a washing filter in the second washing step 6.

At an alternative method, only a partial flow of the pulp is utilized for separating the metal ions from the wastewater in the first washing step. It is, of course, also possible to use an unbleached pulp, which is not intended to be bleached, or a reject pulp flow, for separating the metal ions.

It is further possible to utilize the metal separation according to the invention as a complement to other types of metal separation.

The nature of this invention can also be appreciated by referring to the following examples.

EXAMPLE 1

In this example, the manganese content in an aqueous solution free of lignin, which was treated with pulp bleached with hydrogen peroxide, showed a substantial decrease when the treatment was carried out at a pH of 12 compared to a pH of 10–11. Treatment was carried out for 10 minutes at 80° C.

|  | Liquid |
| --- | --- |
| Initial content (mg/l) | 6.5 |
| Treatment at pH 10 | 6.4 |
| Treatment at pH 11 | 6.5 |
| Treatment at pH 12 | 1.2 |

EXAMPLE 2

In this example, the manganese content was measured in a laboratory-made bleach plant drain after treatment with pulp bleached with hydrogen peroxide. The treatment was carried out at different pH values. At a pH of 12, and in two cases even at a pH of 11, a strong reduction of the manganese content was observed.

|  | Liquid 2 | Liquid 3 | Liquid 4 |
| --- | --- | --- | --- |
| Initial content (mg/l) | 3.3 | 3.5 | 3.6 |
| Treatment at pH 10 | — | — | 3.4 |
| Treatment at pH 11 | 0.7 and, resp. 0.4 | 2.7 | 0.3 |
| Treatment at pH 12 | — | 1.3 | 0.03 |

EXAMPLE 3

In this example, the manganese content was measured in a laboratory-made bleach plant drain after treatment with pulp bleached with hydrogen peroxide, in which the treatment was carried out at different pH's and temperatures. The results show that reaction times exceeding two minutes do not appreciably affect the result. An increase in pH is also shown to be more important than an increase in temperature.

|  | pH 11/80° C. | pH 12/80° C. | pH 11/90° C. |
| --- | --- | --- | --- |
| Initial content (mg/l) | 3.5 | 3.5 | 3.5 |
| Reaction time 2 min | 2.3 | 1.9 | 2.6 |
| Reaction time 10 min | 2.6 | 1.3 | 2.5 |
| Reaction time 60 min | — | — | 2.3 |

EXAMPLE 4

In this example, the manganese content was measured in laboratory-made bleach plant drains from hydrogen peroxide bleaching of pulps with different lignin contents. Treatment was carried out for 10 minutes at 80° C. The lignin content of the pulp, measured as kappa number, was shown to have no decisive effect on the manganese content obtained.

|  | Pulp 1 (kappa Number 5) | Pulp 2 (kappa Number 9) |
| --- | --- | --- |
| Initial content (mg/l) | 3.6 | 3.6 |
| Treatment at pH 10 | 3.4 | — |
| Treatment at pH 11 | 0.3 | 1.1 |
| Treatment at pH 12 | 0.03 | <0.01 |

EXAMPLE 5

Figure 2:
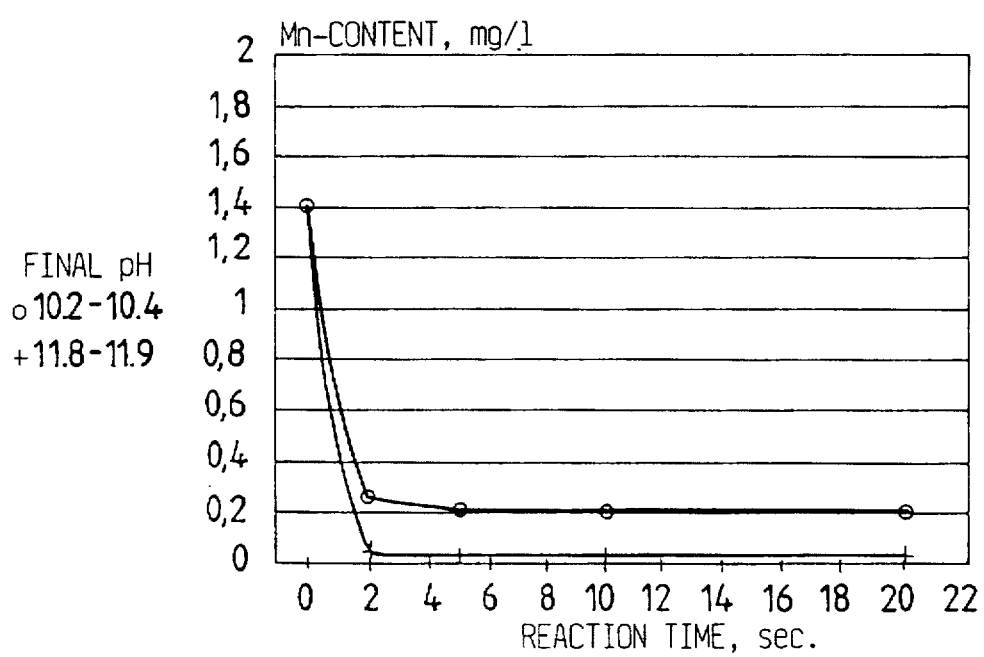
FIG. 2 is a graphical representation showing the manganese content as a function of the reaction time in one embodiment of the method according to the present invention.

In this example, the manganese content in an aqueous solution free of lignin, which was treated with pulp bleached with hydrogen peroxide at different pH values, was measured after different reaction times. The result is shown in FIG. 2. It appears here that a 99% reduction of manganese can be achieved at reaction times of less than about 2 seconds when the pH is between about 11.8–11.9 at 80° C. It also appears that reaction times exceeding about 2 seconds do not further reduce the manganese content.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A method of treating water containing metal ions comprising: providing a pulp comprising lignocellulose-containing material, washing said pulp so as to produce a process water therefrom, said process water containing said metal ions dissolved therein, bleaching said washed pulp with a bleaching agent selected from the group consisting of hydrogen peroxide and ozone, and contacting said process water, including said dissolved metal ions, with said bleached pulp at a pH of greater than about 10 and at a temperature of from about 70° to about 120° C., whereby at least a portion of said metal ions are removed from said process water.

2. The method of claim 1 wherein said process water is contacted with said bleached pulp at a pH of at least about 11.

3. The method of claim 2 wherein said process water is contacted with said bleached pulp at a pH of between about 11 and 12.

4. The method of claim 1 including treating said pulp with a complex former prior to said washing step.

5. The method of claim 1 wherein said pulp is selected from the group consisting of prior bleached pulp, unbleached pulp and reject pulp.

6. The method of claim 2, wherein said process water is contacted with said bleached pulp of a pH of at least about 12.

* * * * *

UNITED STATES PATENT AND TRADEMARK OFFICE
CERTIFICATE OF CORRECTION

PATENT NO. : 5,741,398
DATED : April 21, 1998
INVENTOR(S) : Ulf Germgård, et al

It is certified that error appears in the above-identified patent and that said Letters Patent is hereby corrected as shown below:

On the title page, item [63] should read as follows:

--     Related U.S. Application Data

[63] Continuation of Ser. No. 392,803, Feb. 28, 1995, abandoned, which was the national stage of international application number PCT/SE93/00660, filed Aug. 11, 1993.--.

Signed and Sealed this

Twenty-seventh Day of October, 1998

Attest:

BRUCE LEHMAN

Attesting Officer      Commissioner of Patents and Trademarks